(12) United States Patent
Wang et al.

(10) Patent No.: US 11,636,681 B2
(45) Date of Patent: Apr. 25, 2023

(54) ANTICIPATING FUTURE VIDEO BASED ON PRESENT VIDEO

(71) Applicant: META PLATFORMS, INC., Menlo Park, CA (US)

(72) Inventors: Heng Wang, Mountain View, CA (US); Du Le Hong Tran, Palo Alto, CA (US); Antoine Miech, Redwood City, CA (US); Lorenzo Torresani, Norwich, VT (US)

(73) Assignee: Meta Platforms, Inc., Menlo Park, CA (US)

( * ) Notice: Subject to any disclaimer, the term of this patent is extended or adjusted under 35 U.S.C. 154(b) by 215 days.

(21) Appl. No.: 16/688,367

(22) Filed: Nov. 19, 2019

(65) Prior Publication Data

US 2020/0160064 A1      May 21, 2020

Related U.S. Application Data

(60) Provisional application No. 62/770,539, filed on Nov. 21, 2018.

(51) Int. Cl.
  *G06V 20/40*      (2022.01)
  *G06N 20/00*      (2019.01)
  *G06K 9/62*       (2022.01)
  *G06V 20/00*      (2022.01)

(52) U.S. Cl.
  CPC .......... *G06V 20/46* (2022.01); *G06K 9/6256* (2013.01); *G06N 20/00* (2019.01); *G06V 20/35* (2022.01); *G06V 20/49* (2022.01); *G06V 20/44* (2022.01)

(58) Field of Classification Search
  CPC .......... G06K 9/00744; G06K 9/00765; G06K 9/00684; G06K 9/6256; G06K 2009/00738; G06K 9/6297; G06K 9/00718; G06K 9/4628; G06N 20/00; G06N 7/005; G06N 3/08; G06N 3/0454
  See application file for complete search history.

(56) References Cited

U.S. PATENT DOCUMENTS

| | | | |
|---|---|---|---|
| 10,339,421 B2 * | 7/2019 | Mei | G06N 3/08 |
| 10,504,003 B1 * | 12/2019 | Flowers | G06V 20/597 |
| 10,679,046 B1 * | 6/2020 | Black | G06N 3/0454 |
| 10,930,011 B2 * | 2/2021 | Spooner | G06T 7/74 |
| 2017/0193338 A1 * | 7/2017 | Huberman | G06V 20/56 |
| 2018/0150726 A1 * | 5/2018 | Gorban | G06K 9/6269 |
| 2018/0285689 A1 * | 10/2018 | Mei | G06K 9/6256 |
| 2019/0073524 A1 * | 3/2019 | Yi | G06V 10/82 |
| 2019/0114744 A1 * | 4/2019 | Albrecht | G06T 3/4053 |
| 2019/0138798 A1 * | 5/2019 | Tang | G06V 10/82 |
| 2019/0205626 A1 * | 7/2019 | Kim | G06K 9/6257 |
| 2019/0205629 A1 * | 7/2019 | Zhu | G06V 20/42 |

(Continued)

*Primary Examiner* — Solomon G Bezuayehu
(74) *Attorney, Agent, or Firm* — Jordan IP Law, LLC

(57) ABSTRACT

In one embodiment, a method includes accessing a first set of images of multiple images of a scene, wherein the first set of images show the scene during a time period. The method includes generating, by processing the first set of images using a first machine-learning model, one or more attributes representing observed actions performed in the scene during the time period. The method includes predicting, by processing the generated one or more attributes using a second machine-learning model, one or more actions that would happen in the scene after the time period.

19 Claims, 7 Drawing Sheets

(56) References Cited

U.S. PATENT DOCUMENTS

| | | | |
|---|---|---|---|
| 2019/0251366 A1* | 8/2019 | Zhong | G06V 20/41 |
| 2019/0272750 A1* | 9/2019 | Fukumoto | G08G 1/096791 |
| 2019/0325273 A1* | 10/2019 | Kumar | G06T 7/0016 |
| 2019/0373264 A1* | 12/2019 | Chong | H04N 19/13 |
| 2019/0384985 A1* | 12/2019 | Tang | G06N 3/0454 |
| 2020/0005644 A1* | 1/2020 | Ichimaru | G08G 1/096775 |
| 2020/0084427 A1* | 3/2020 | Sun | G06N 3/0454 |
| 2020/0086879 A1* | 3/2020 | Lakshmi Narayanan | G06V 40/20 |
| 2020/0089238 A1* | 3/2020 | McGill, Jr. | G06N 3/08 |
| 2020/0089969 A1* | 3/2020 | Lakshmi Narayanan | G06V 20/41 |
| 2020/0099790 A1* | 3/2020 | Ma | G06Q 10/063112 |
| 2020/0117958 A1* | 4/2020 | Brown | G06N 3/08 |
| 2020/0202527 A1* | 6/2020 | Choi | A61B 8/08 |
| 2020/0249637 A1* | 8/2020 | Wee | G06N 20/20 |
| 2020/0257301 A1* | 8/2020 | Weiser | G06N 3/02 |
| 2021/0048785 A1* | 2/2021 | Drees | G06N 7/00 |

* cited by examiner

ANTICIPATING FUTURE VIDEO BASED ON PRESENT VIDEO

PRIORITY

This application claims the benefit, under 35 U.S.C. § 119(e), of U.S. Provisional Patent Application No. 62/770,539, filed 21 Nov. 2018, which is incorporated herein by reference.

TECHNICAL FIELD

This disclosure generally relates to automated video processing and understanding.

BACKGROUND

Automatic video understanding has improved significantly over the last few years. Such advances have manifested in disparate video understanding tasks, including action recognition, temporal action localization, video search, video summarization and video categorization.

SUMMARY OF PARTICULAR EMBODIMENTS

Particular embodiments include a video processing and recognition system that uses a new model for future action anticipation. Action anticipation may be modelled as a fusion of two complementary modules. One module may use a predictive approach based on a purely anticipatory model. The predictive module may aim to directly predict future action given the present. A second module may use a transitional approach based on a transitional model. The transitional model may be first constrained to recognize what is currently seen and then use this output to anticipate future actions. This model improves over state-of-the-art action anticipation performances on various public datasets.

Particular embodiments include a new framework for the task of anticipating human actions several seconds before they are performed. The model of the framework is decomposed into two complementary models. The first, named the predictive model, anticipates action directly from the visual inputs. The second one, the transitional model, is first constrained to predict what is happening in the observed time interval and then leverages this prediction to anticipate the future actions. Extensive experiments on three datasets with state-of-the-art results on the EPIC-KITCHENS and Breakfast action dataset, demonstrate the efficacy of this approach. In particular embodiments, the model provides ways to explain its outputs, which allows reviewers to easily interpret the model as demonstrated in a qualitative analysis. Predicting the future is a big area. This disclosure touches on future frame, motion and semantic mask prediction as well as human trajectory and action prediction, which we review below.

Particular embodiments include a method comprising accessing a first set of images of a plurality of images of a scene, wherein the first set of images show the scene during a time period. The plurality of images of the scene may be still images from, or frames of, a video of the scene. The method may include generating, by processing the first set of images using a first machine-learning model, one or more attributes representing observed characteristics of the scene (e.g., actions performed in the scene) during the time period. The first machine-learning model may be, as an example and not by way of limitation, a convolutional neural network ("CNN"). The first machine-learning model may receive the first set of images as input and provide the one or more attributes as output. The one or more attributes may represent observed characteristics of the scene during the time period, a description of the scene during the time period, a description of an action performed in the scene, a description of entities in the scene, or any other suitable observable properties. The method may include predicting, by processing the generated one or more attributes using a second machine-learning model, one or more actions that would happen in the scene after the time period. The second machine-learning model may be a Markov transition model, or a machine-learning model of a related type.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
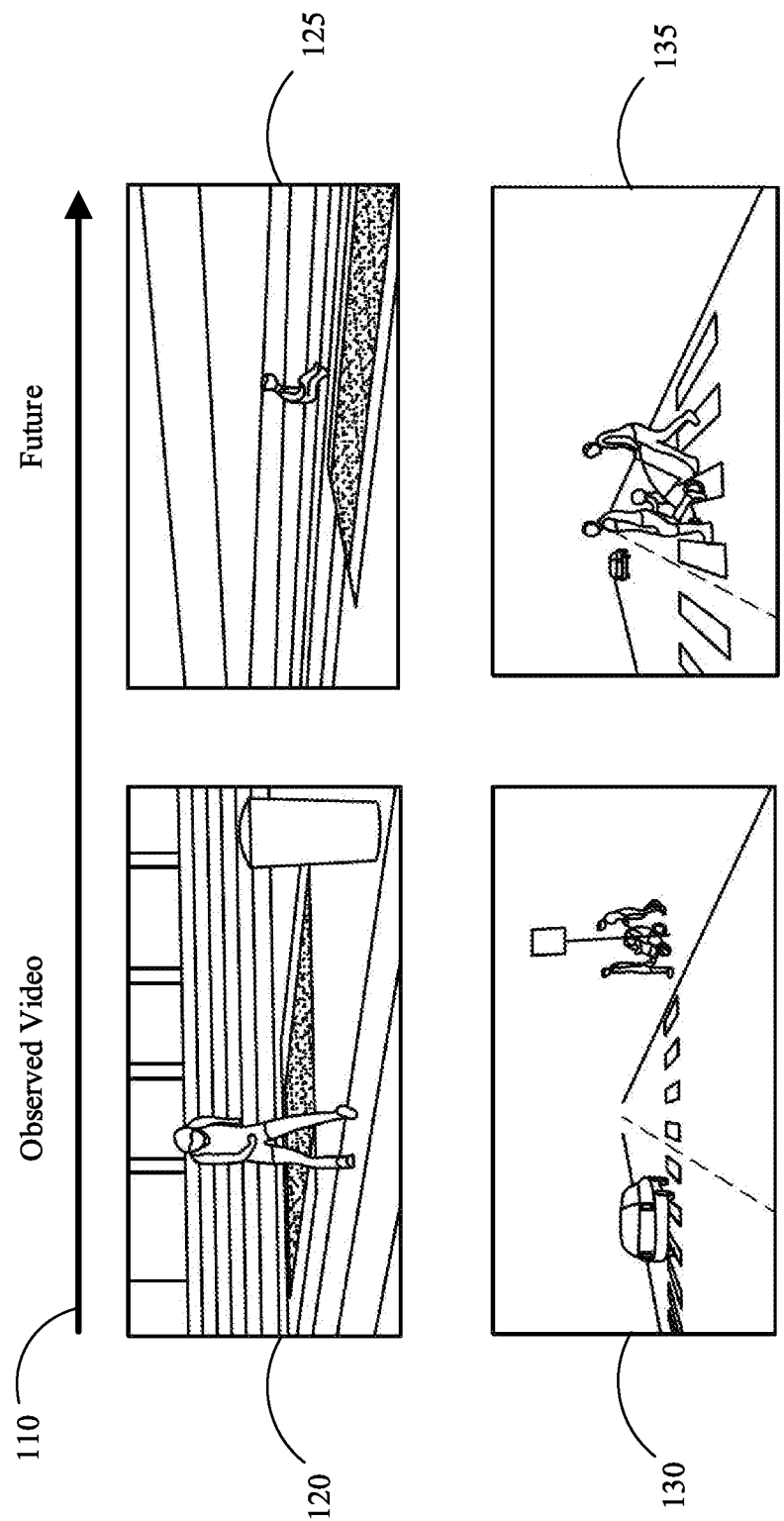
FIG. 1 illustrates an example of anticipating future actions in videos.

Particular embodiment of this disclosure address the problem of anticipating future actions in videos as illustrated in FIG. 1. FIG. 1 illustrates frames of videos that feature actions at two points along a timeline 110. A first video, to the top of FIG. 1, shows a person preparing to perform, and performing, a long jump. In the context of analyzing actions in videos, the "Observed Video" portion of the video may be the portion captured in part in image 120 showing the person during a run in preparation for the jump. The "Future" portion of the video may be the portion captured in part in image 125 showing the person mid-jump. A second video, to the bottom of FIG. 1, shows a family preparing to cross, and crossing, a busy street in front of a vehicle that is approaching the family. In the context of analyzing actions in videos, the "Observed Video" portion of the video may be the portion captured in part in image 130 showing the family approaching a crosswalk. The "Future" portion of the video may be the portion captured in part in image 135 showing the family in the crosswalk. The family is closer to the approaching vehicle because the vehicle is moving along the road in the direction of the family.

A significant amount of prior work in automatic video understanding has focused on the task of action recognition. The goal of action recognition is often to recognize what action is being performed in a given video. For example, determining from the video shown, in part, in images 130 and 135 that the video features a family crossing the street. While accurate recognition is crucial for a wide range of practical applications such as video categorization or automatic video filtering, certain settings do not allow for complete or even partial observation of action before it happens. For instance, it may be desired for an autonomous car to recognize the intent of a pedestrian to cross the road long before the action is initiated in order to avoid an accident. Similarly, in the case of baby bedroom monitoring, it may not be satisfying to merely recognize that a baby has fallen from a bed as the purpose of the monitoring is to avoid the baby falling in the first place. In practical applications such as these, where one may seek to act before an action is executed (e.g., to act preventatively), being able to anticipate the future given the conditions of the present is critical.

Anticipating the future, especially in the long-term, is a challenging task because the future is not deterministic: several outcomes are possible given a current observation. To reduce uncertainty, most previous work in the field requires partially observed execution of actions (e.g., observation of actions in progress). Particular embodiments disclosed herein address the task of action anticipation even when no partial observation of the action is available (e.g., before the predicted action has started). Particular embodiments focus on leveraging advanced action and scene recognition models to improve future action prediction. Improved automated future action prediction derives from two approaches. In one approach, the future of the scene is directly anticipated. In another approach a present state of the scene is recognized the present, from this state recognition, the future state is predicted. A further improvement is derived from a fusion of the two approaches. The complementary nature of these two approaches has been experimentally demonstrated by the disclosed system in evaluating the performance of the system on three distinct and diverse benchmarks: EPIC-KITCHENS, Breakfast, and ActivityNet, explained below. Particular embodiments improve on state-of-the-art accuracy.

Particular embodiments disclosed herein include a video processing and recognition system that uses a new model for future action anticipation. Action anticipation may be modelled as a fusion of two complementary techniques. One uses a predictive approach based on an anticipatory model. The predictive module may aim to directly predict future action given the present as captured in one or more images of a video. A second may use a transitional approach based on a transitional model. The transitional model may first recognize what is seen in the images of a video and then use the output of the recognition process to anticipate future actions. This model of action anticipation demonstrates technical advancement and improvement over previous through demonstrated improvement over state-of-the-art action anticipation performances on various public datasets.

Particular embodiments include a new framework for the task of anticipating human actions several seconds before they are performed. The model of the framework is decomposed into two complementary models. The first, named the predictive model, anticipates action directly from the visual inputs. The second one, the transitional model, may first be constrained to predict what is happening in the observed time interval and then leverages this prediction to anticipate the future actions. Extensive experiments on three datasets with state-of-the-art results on the EPIC-KITCHENS and Breakfast action dataset, demonstrate the efficacy of this approach. In particular embodiments, the model provides clear methods to explain its outputs, which allows reviewers to easily interpret the model as demonstrated in a qualitative analysis. Predicting the future is a large and difficult area. This disclosure describes concepts relating to future frame, motion, and semantic mask prediction as well as human trajectory and action prediction.

Particular embodiments include a method comprising accessing a first set of images of a plurality of images of a scene, wherein the first set of images show the scene during a time period. The plurality of images of the scene may be still images from, or frames of, a video of the scene. The method may include generating, by processing the first set of images using a first machine-learning model, one or more attributes representing observed characteristics of the scene (e.g., actions performed in the scene) during the time period. The first machine-learning model may be, as an example and not by way of limitation, a convolutional neural network ("CNN"). The first machine-learning model may receive the first set of images as input and provide the one or more attributes as output. The one or more attributes may represent observed characteristics of the scene during the time period, a description of the scene during the time period, a description of an action performed in the scene, a description of entities in the scene, or any other suitable observable properties. The method may include predicting, by processing the generated one or more attributes using a second machine-learning model, one or more actions that would happen in the scene after the time period. The second machine-learning model may be a Markov transition model, or a machine-learning model of a related type.

In particular embodiments, a video processing system may anticipate an action T seconds before it starts. Stated more formally, let V denote a video. Then, indicate with $V_{a:b}$ the segment of V starting at time a and ending at time b, and with $y_c$ a label for the video that starts at time c. For example, the label may be a label of an action being performed in the video. In particular embodiments, a video processing system may employ a function $f$ such that $f(V_{0:t})$ predicts $y_{t+T}$. That is to say, executing the function over a first portion of video (e.g., images of the video during the time period of that first portion) predicts a label for the video in a later or expected future portion of the video. As described herein, the function may be or comprise one or more machine-learning models of a variety of classifications. The machine-learning models may have been trained, as appropriate, to perform a subset of the task of predicting future labels for video given a input including one or more images from the video over a time period.

Particular embodiments may decompose $f$ as a weighted average of two functions, a predictive model $f_{pred}$ and a transitional model $f_{trans}$ such that:

$$f = \alpha f_{pred} + (1-\alpha) f_{trans}, \ \alpha \in [0,1],$$

where α is a hyper-parameter. The first function $f_{pred}$ may be trained to predict the future action directly from the observed segment. The second function, $f_{trans}$ may be first constrained to discern properties of the observed segment. As an example, the discerned properties may include high-level properties such as attributes of the depicted scene, a description or classification of the depicted scene, a description or classification of one or more entities identified in the scene, or the action performed in the present, any other suitable properties, or any suitable combination thereof. In particular embodiment, "high-level attributes" may be differentiated from other attributes in how the "high-level attributes" tend to relate to an image or video as a whole, as opposed to identifying distinct properties of the image. As another example, the discerned properties may include other properties used in image analysis that are based on the data stored within the image (or set of images), such as color values, intensity, shapes or forms, etc. In particular embodiments, a second stage, $f_{trans}$ may use this information to anticipate the future action. As described above, the two models, $f_{pred}$ and $f_{trans}$ may be learned models (e.g., machine-learning models). The output of the predictive model (e.g., actions or characteristics predicted by the processing of the predictive model) and the transitional model (e.g., actions or characteristics predicted by the processing of the transitional model) may each be assigned respective scores. A weighted average of the scores may be combined to determine a composite, final prediction.

Figure 2:
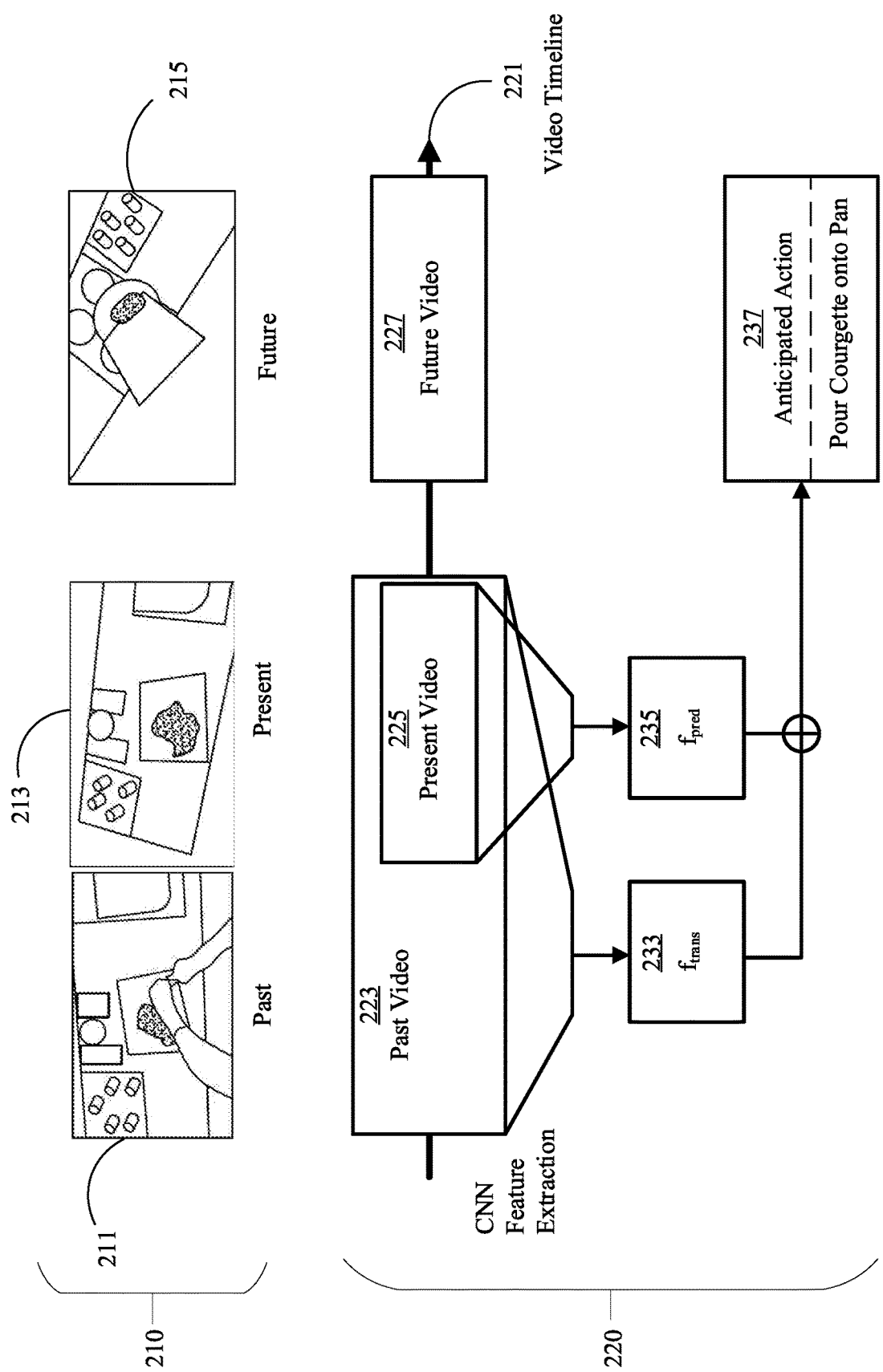
FIG. 2 illustrates a model for anticipating future actions in videos.

FIG. 2 presents an overview of a model of the system described herein. FIG. 2 illustrates a video timeline 221 running from the "past" on the left-hand side of the figure to the "present" in the middle of the figure, to the "future" on the right-hand side of the figure. Thus, while portions of the figure corresponding to the "past" portion of the timeline are designated has having already happened, and portions of the figure corresponding to the present are presently happening, portions of the figure corresponding to the "future" portion of the timeline may not have occurred in the context of the examples described herein. FIG. 2 illustrates several images from a video 210 that correspond to relative points on the timeline 221. Although this disclosure variously discusses images in its examples, in operation short portions of video (e.g., several seconds or longer) may be used, even though they may not be capable of representation in the figures. For example, image 211, designated "past" occurs prior to image 213, designated "present." Likewise, image 215, designate "future" occurs after image 213. Each image 211, 213, 215 illustrates, in this example, an action that is occurring during the respective portion of the video 210 corresponding to a relative point on the timeline 215. Image 213 may show some chopped vegetables resting on a cutting board in a kitchen. Image 211 (in the "past" relative to image 213 shows a person chopping the vegetables. As will be discussed herein, image 215 shows a person adding the vegetables to a pan on the stove in the kitchen.

FIG. 2 further illustrates portions of the functions and models used by the system 220 to predict actions and other labels for "future video" 227 based on "present video" 225 and, in some embodiments, "past video" 225. As illustrated in FIG. 2, and further described herein, the predictive model $f_{pred}$ 235 may use information from the designated present video 235 (designated, for example, as part of the input to the model). In some embodiments, the predictive model $f_{pred}$ 235 may be a separate machine-learning model, trained with the goal of anticipating future action from "present" video. Similarly, the transitional model $f_{trans}$ 233 may use information from the designated past video 223 and present video 235. In some embodiments, the transitional model $f_{trans}$ 233 may be a composite of multiple separate machine-learning models, trained, for example, to generate attributes representing observed actions in the scene or observed characteristics and to predict actions that would happen in the scene, or characteristics that would be observed in the scene, based on the generated attributes. In some embodiments, the transitional model $f_{trans}$ 233 may be a composite of two such trained machine-learning models as described below. In particular embodiments, outcomes from the predictive model 235 and transitional model 233 may be combined to determine a label, attribute, description, or anticipated action 237 for the designated future video 227. For example, the output of the predictive model 235 and transitional model 233 may be combined to determine a composite predicted action or observed characteristic. In particular embodiments, the goal of the predictive model $f_{pred}$ 235 may be to directly anticipate future action from the visual input, e.g., the video or frames corresponding to the present video 225. As opposed to the transitional model $f_{trans}$ 233, the predictive model $f_{pred}$ 235 may not be subject to any specific constraint. In particular embodiments, the predictive model $f_{pred}$ 235 may be trained using loss minimization on a set of training images and corresponding potential predicted actions. For example, suppose that a video processing system is provided with a training video V with action labels $y_{t_0+T}, \ldots, y_{t_n+T}$. For each label $y_{t_i+T}$, the goal may be to minimize the loss:

$$l(f_{pred}(V_{s(t_i):ti}), y_{ti+T}),$$

where $s(t_i) = \max(0, t_i - t_{pred})$, l is the cross entropy loss, and $t_{pred}$ is a hyper-parameter that represents the maximum temporal interval of a video that the predictive model $f_{pred}$ 235 has access to. In particular embodiments, this hyper-parameter may provide improvements over previous approaches because permitting the predictive model $f_{pred}$ 235 to look too much in the "past" relative to a target "present" scene may add irrelevant information that degrades prediction performance. The loss may then be summed up over all videos from a training video dataset. In particular embodiments, the predictive model $f_{pred}$ 235 may be a linear model which takes as input a video descriptor described below.

Figure 3:
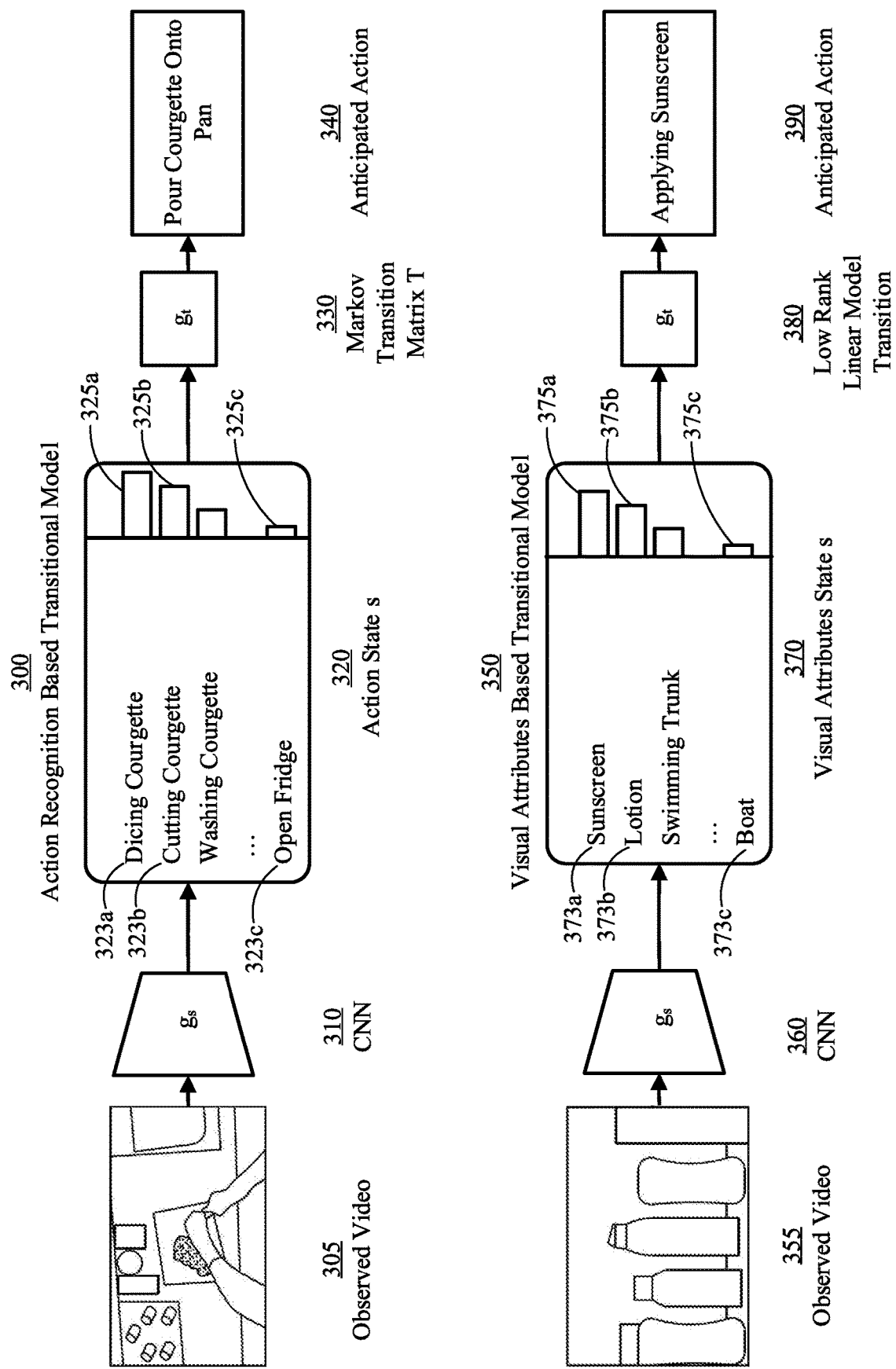
FIG. 3 illustrates a transitional model for anticipating future actions in videos.

FIG. 3 illustrates a detailed model for the transitional model $f_{trans}$ 233. In particular embodiments, the transitional model $f_{trans}$ 233 may split the prediction into two stages: $g_s$ (e.g., 310) and $g_t$ (e.g., 330). The first stage $g_s$ may aim to recognize a current state s and, from the current state describe the observed video segment (e.g., 305). As an example, the state s (e.g., 320) may represent an action, a latent action-attribute, an entity determined to be in the video segment, image features regarding the state, etc. The second stage $g_t$ (e.g., 330) may take as input the current state s (e.g., 320) and anticipate the next action (e.g., 340) given the current state s. In particular embodiments, the first stage, $g_s$, may be conceptualized as a complex function extracting high-level information from the observed video segment. In particular embodiments, the second stage $g_t$ may be conceptualized as a simple (e.g., linear) function operating on the state s and modeling the correlation between the present state and the future action. Processing the attributes expressed in the state s may comprise using the second stage (e.g., a machine-learning model) to correlate the generated attributes with potential predicted actions for the scene after the time period.

This disclosure envisions several approaches for the transitional model $f_{trans}$ 233. Two such approaches are illustrated in FIG. 3. A first approach for the transitional model $f_{trans}$ 233, shown as procedure 300 is based on action recognition. A second approach for the transitional model $f_{trans}$ 233, shown as procedure 350 is based on additional visual attributes.

Particular embodiments leverage graphical signals, such as visual attributes to anticipate the future. Some form of graphical signals or visual attributes may have been used previously for action recognition. For example, a set of visual attributes describing the presence or absence of objects, scenes or atomic actions in a video may be predefined. Then, a model may be trained on these visual attributes for action recognition. Particular embodiments improve on the concept of visual attributes by using visual attributes as a means to express the transitional model. The current state $s \in [0,1]^a$ predicted by $g_s$, may then be represented as a vector of visual attributes probabilities, where a is the number of visual attributes. Given the presently observed visual attribute s, $g_t$ predicts the future action. Particular embodiments model $g_t$ as a low-rank linear model:

$$g_t(s)=W_2(W_1s+b_1)+b_2,$$

where $W_1 \in \mathbb{R}^{r \times a}$, $W_2 \in \mathbb{R}^{K \times r}$, $b_1 \in \mathbb{R}^r$, $b_2 \in \mathbb{R}^K$, $K \in \mathbb{N}$ the number of action classes and r is the rank of $g_t$. These parameters may be learned, in the same manner as the predictive model, by minimizing the cross-entropy loss between the predicted action given by $g_t(s)$ and the future action ground-truth. Implementing $g_t$ through a low-rank model may reduce the number of parameters to estimate. This may lead to better accuracy. The lower part of FIG. 3, illustrating the approach 350 based on visual attributes, illustrates this case.

The first stage $g_s$ 360 in this example, is a machine-learning model. In particular, in this example, it is a convolutional neural network ("CNN"). The first stage $g_s$ 360 receives the observed video 355 as input. The observed video may align with the "present" video in the model illustrated in FIG. 2. From the observed video 355, the first stage $g_s$ 360 determines a visual attributes state s 370. The visual attributes state s 370 indicates a number of potential visual attributes 373a, 373b, 373c, etc. and corresponding associated probabilities 375a, 375b, and 375c, respectively. The probabilities 375 (which may also be interpreted, for example, as confidence scores) may indicate a determined likelihood that the corresponding visual attribute 373 is accurately represented—that the visual attribute appears in the observed video 355. The information in the visual attributes state s 370 is passed to the second stage $g_t$ 380. In this example, the second stage $g_t$ 380 is a machine-learning model. In particular, it is implemented as a low rank linear model transition. From this information, the second the second stage $g_t$ 380 predicts an anticipated action 390, which in this case is "applying sunscreen" based on the determination at a high probability that the observed video 355 includes sunscreen or lotion.

Real-world videos often consist of a sequence of elementary actions performed by a person in order to reach a final goal such as "Preparing coffee," "Changing car tire," or "Assembling a chair." As an example, some datasets that may be used to train action-recognition systems include a training set where each video has been annotated with action labels and segment boundaries for all occurring actions. Action labels may refer to human understandable descriptions of the labeled item (in this case the action). Segment boundaries may be considered analogous to listed timestamps when the labelled action occurs. When available, particular embodiments may use action labels instead of predefined visual attributes for state s (as in visual attributes states s 370). In some embodiments, anticipation of the next action (e.g., "Pouring coffee") may depend on the present action (e.g., "Preparing coffee") being performed, e.g., the action captured in the observed video. In other words, particular embodiments may rely on a Markov assumption on the sequence of performed actions. As a more formal example, suppose an ordered sequence of action annotations $(a_0, \ldots, a_N) \in \{1, \ldots, K\}^N$ for a given video is provided, where $a_n$ defines the action class performed in video segment $V_n$. Particular embodiments model $P(a_{n+1}=i|V_n)$ as follows:

$$P(a_{n+1}=i \mid V_n) = \sum_{j=1}^{K} P(a_{n+1}=i \mid a_n=j)P(a_n=j \mid V_n)$$

$\forall n \in \{0, \ldots N-1\}$, $i \in \{1, \ldots K\}$. This reformulation decomposes the computation of $P(a_{n+1}=i|V_n)$ in terms of two factors: (1) an action recognition model $g_s(V_n)$ that may predict $P(a_n=j|V_n)$, (e.g., the action being performed in the present); and (2) a transition matrix T that may capture the statistical correlation between the present and the future action, (e.g., such that $T_{ij} \approx P(a_{n+1}=i|a_n=j)$). In this scenario, $g_t$ may take as input the probability scores of each action given by $g_s$ to anticipate the next action in a probabilistic manner:

$$g_t(s)=Ts,$$

$$P(a_{n+1}=i)=\sum_{j=1}^{K} T_{i,j}s_j=[g_t(s)]_i.$$

Particular embodiments may compute T by estimating the conditional probabilities between present and future actions from the sequences of action annotations in the training set. This model is illustrated in the top part of FIG. 3.

The first stage $g_s$ 310 in this example, is a machine-learning model. In particular it is a convolutional neural network. The first stage $g_s$ 310 receives the observed video 305 as input. The observed video 305 in this example shows a person cutting courgettes on a cutting board. The observed video may align with the "present" video in the model illustrated in FIG. 2. From the observed video 305, the first stage $g_s$ 310 determines an action state s 320. The action state s 310 indicates a number of potential actions 323a, 323b, 323c, etc. that may describe the activity shown in the observed video 305. The action state s 310 may also include corresponding associated probabilities 325a, 325b, and 325c, respectively. The probabilities 325 (which may also be interpreted, for example, as confidence scores) may indicate a determined likelihood that the corresponding action 373 is accurately represented—that the action (e.g., action label) accurately describes the activity in the observed video 305. The information in the action state s 320 is passed to the second stage $g_t$ 330. In this example, the second stage $g_t$ 330 is a machine-learning model. In particular, it comprises a Markov transition matrix. The Markov transition matrix includes a listing of potential actions from the scene, based on the performed training, and indicates in its recitation of probabilities which detected attributes or actions are determinative of the potential actions. From this information, the second stage $g_t$ 330 predicts an anticipated action 340, which in this case is "Pour courgette onto pan" based on the determination at a high probability that the observed video 305 includes a person dicing courgette (323a) or cutting courgette (323b). The use of a Markov transition matrix may allow the second stage $g_t$ 330 to probabilistically attribute action labels to predicted anticipated actions. The weight of the Markov transition matrix may be machine-learned from a training set.

In particular embodiments, the transitional model $f_{trans}$ may provide interpretable predictions that can be easily analyzed for explanation. Providing such insight into the workings of the transitional model $f_{trans}$ is one of many improvements to previous systems for action-recognition and prediction. In particular embodiments, the function $g_t$ of the transitional model may take the form of a simple linear model applied to the state s, both when using visual attributes as well as when using action predictions or any other suitable attributes used for predicting anticipated actions or scene descriptions and labels thereof. The linear weights of $g_t$ may be interpreted as conveying the importance of each element in s for the anticipation of the action class. For example, given an action class k to anticipate, in particular embodiments, the linear weights of $g_t$ may be analyzed to understand which visual attributes or action class are most predictive of, e.g., responsible for the prediction of, action class k. For example, the linear weights may reflect that action labels such as "grind coffee" and "brew coffee" are more predictive of the action "pour coffee" than actions such as a "measure pasta" or "fill pot."

Particular embodiments also provide an easy way to diagnose the source of mispredictions. For example, suppose the transitional model anticipates wrongly an action k. To understand the reason behind such misprediction, in particular embodiments, let $v_1, \ldots, v_a \in [0,1]$ be the vectors encoding the visual attributes (or action recognition scores) for this wrong prediction. Let also $w_{k,1}, \ldots, w_{k,a} \in \mathbb{R}$ be the learned linear weights associated to the prediction of action class k. The top factor for the prediction of action k may be $\max_{i \in [1,a]}(w_{k,i}, v_i)$. By analyzing this top factor, particular embodiments may enable understanding whether the misprediction is due to a recognition problem (e.g., wrong detection score for the visual attribute/action class), due to the learned transition weights, or due to some other easily diagnosable error.

The described system has been empirically evaluated on three datasets. These datasets are diverse and, to facilitate training and verification, include accurate annotated action temporal segments used for the evaluation of action anticipation.

EPIC-KITCHENS is a largescale cooking video dataset containing 39,594 accurate temporal segment action annotations. Each video is composed of a sequence of temporal segment annotations. Three different tasks may be proposed together with the dataset: object detection, action recognition and action anticipation. The action anticipation task may include predicting an action some time, e.g., one second, before it has started. The dataset includes three different splits: the training set, the seen kitchens test set (S1) composed of videos from kitchens also appearing in the training set and the unseen kitchens test set (S2) with kitchens that do not appear in the training set. Unless specified otherwise, for comparison purposes, experiments are reported with T=1 sec.

The Breakfast action dataset is an annotated cooking video dataset of people preparing breakfast meals. It comes with 11267 temporal segment action annotations. Each video includes a sequence of temporal action segment annotations. The dataset is partitioned into four different train/test splits: S1, S2, S3 and S4. Performance has been quantified with the average scores over all of the four splits. Unless specified differently, for comparison purposes, experiments are reported with T=1 sec.

The ActivityNet 200 video dataset includes 15410 temporal action segment annotations in the training set and 7654 annotations in the validation set. This video dataset may be used for evaluating action localization models, but, as the videos are provided with accurate temporal segment for each action, they can also be used to evaluate models on action anticipation. As opposed to the EPICKITCHENS and Breakfast datasets, each video includes only one action annotation instead of a sequence of action segments. For this reason, the transitional model based on action recognition (e.g., approach 300) has not been tested on the ActivityNet dataset. Only videos in the datasets with at least 10 seconds of video before the action starts have been trained and evaluated on. In total, the training and validation sets included respectively 9985 and 4948 action localization annotations.

In particular embodiments, the observed video segment V may be split into clips, to facilitate action prediction. Then, a clips representation may be extracted and pooling performed over these clips. For example, given an input video segment V, in particular embodiments, the input video segment V may be split into small clips $V=[V_1, \ldots, V_n]$ where each clip $V_i$, $i \in [1, N]$ is short enough (e.g. 8 or 16 frames) that it can be fed into a pretrained video convolutional neural network ("CNN") C. From the penultimate layer of the CNN an $L_2$-normalized one-dimensional representation $C(V_i)$ for each clip $V_i$ may be extracted. Then, particular embodiments perform a temporal aggregation $Agg([C(V_1), \ldots, C(V_N)])$ of the extracted features to get a one-dimensional video representation for V. In particular embodiments, C is an R(2+1)D network of 18-layers. In some embodiments, simple max pooling is performed to aggregate features from all clips. In some embodiments of the described model, more sophisticated temporal aggregation techniques may be used.

Visual attributes may include the taxonomies of Imagenet-1000, Kinetics-600, and Places-365. In particular embodiments, two ResNet-50 CNN models may be trained: one on Imagenet-1000 and the other one on Places-365. For the Kinetics-600 taxonomy, an R(2+1)D-18 model may be trained. As an example only and not by way of limitation, one set of visual attributes used with these examples may be composed of 1965 (1000+600+365) visual attributes. In particular embodiments, these visual attributes may be densely extracted every 0.5 seconds and a temporal max pooling operation may be applied to obtain a single vector for each video, as discussed above.

In particular embodiments, the video representation may be learned by fine-tuning a pre-trained video CNN on the task of action anticipation. Particular embodiments may improve on this technique by fine-tuning the CNN representation on the task of action recognition on the target dataset. More specifically, instead of training the CNN on video clips sampled before action starts, particular embodiments may train the CNN on clips sampled in the action segment interval itself. For example, the task of action recognition is "easier" than action anticipation and thus it may lead to better feature learning.

Table 1 reports accuracies on the EPIC-KITCHENS validation set obtained with the described predictive model applied to different CNN representations. These results illustrate the potential benefit of fine-tuning the CNN on action recognition, instead of action anticipation directly, as has been done previously. Table 1 also provides numbers for two additional baselines corresponding to: (1) using a CNN pre-trained on the Kinetics dataset without fine-tuning; and (2) extracting features from a ResNet-50 2D CNN pretrained on Imagenet. It may be noted that the best accuracies for actions, verbs, and nouns are obtained with the CNN fine-tuned on the action recognition task of the EPIC-KITCHENS dataset. Thus, particular embodiments use CNN features computed from a R(2+1)D-18 first pre-trained on Kinetics and then fine-tuned for action recognition on the target dataset.

Table 1 illustrates Top-1 accuracy for a variety of ways of pretraining the model for EPIC-KITCHENS action anticipation.

TABLE 1

| Model | Pretrain | Fine-tune | Action | Verb | Noun |
|---|---|---|---|---|---|
| ResNet-50 | Imagenet | No | 3.4 | 24.5 | 7.4 |
| R(2 + 1)D – 18 | Kinetics | No | 5.2 | 27.2 | 10.3 |
| R(2 + 1)D – 18 | Kinetics | EK-Anticip. | 5.0 | 24.6 | 9.7 |
| R(2 + 1)D – 18 | Kinetics | EK-Recogn. | 6.0 | 27.6 | 11.6 |

To further demonstrate the benefits of the different components in the described model, the predictive model may be evaluated separately from the transitional model. Table 2 summarizes the results achieved on the validation set of EPIC-KITCHENS for both the variant of the transitional model based on Visual Attributes (VA) as well as the version based on Action Recognition (AR). The AR transitional model may perform better than the VA transitional model. However, both are outperformed by the purely predictive model. In some embodiments, combining the predictive model with either of the two transitional models may yield further accuracy gains. This may suggest that the predictions from each of the predictive and transitional model are complementary.

Table 2 illustrates an EPIC-KITCHENS transitional model and predictive model ablation study on a validation set with T=1 sec. In Table 2, VA stands for "Visual Attributes" and "AR for Action Recognition." The bottom two rows may be interpreted as accuracies upper bounds.

TABLE 2

|  | Action | | Verb | | Noun | |
|---|---|---|---|---|---|---|
|  | A @ 1 | A @ 5 | A @ 1 | A @ 5 | A @ 1 | A @ 5 |
| Transitional (VA) | 4.6 | 12.1 | 25.0 | 71.7 | 9.1 | 24.5 |
| Transitional (AR) | 5.1 | 17.1 | 25.2 | 72.0 | 12.1 | 33.2 |
| Predictive | 6.3 | 17.3 | 27.4 | 73.1 | 11.9 | 31.5 |
| Predictive + Transitional (VA) | 3.8 | 18.1 | 28.4 | 74.0 | 12.5 | 33.0 |
| Predictive + Transitional (AR) | 6.7 | 19.1 | 27.3 | 73.5 | 12.9 | 34.6 |
| Transitional (AR with GT) | 16.1 | 29.4 | 29.3 | 63.3 | 30.7 | 44.4 |
| Action recognition | 12.1 | 30.0 | 39.3 | 80.0 | 23.1 | 49.3 |

The bottom two rows of Table 2 also include an accuracy upper bound achieved when directly recognizing the future frame as opposed to predicting from the past one (row Action recognition). The row Transitional (AR with GT) shows the accuracy achieved when the transitional model is provided the ground-truth label of the last observed action. The improvement when using the ground-truth label may be significant. As an example, this may suggest that a large cause of missing performance is weak action recognition models and that better action recognition, as proposed by the embodiments described herein, may produce stronger results for prediction.

An ablation study on the ActivityNet dataset is shown in Table 3. Since the ActivityNet dataset does not provide sequences of action annotations in this dataset, this experiment only applied the transitional model based on Visual Attributes. The complementarity of the predictive and transitional models may be demonstrated. As an example, the average of both approaches provides the best results for action anticipation. The value of modeling $g_t$ as a low-rank linear model on visual attributes may also be demonstrated. In particular embodiments, constraining $g_t$ to be a low-rank linear model provides a boost of more than 4% in accuracy.

TABLE 3

Table 3: ActivityNet action anticipation accuracy results on a validation set with T = 5 sec.

| Model | Accuracy |
|---|---|
| Random baseline | 0.3 |
| Predictive | 51.6 |
| Transitional (VA, Full rank) | 48.0 |
| Transitional (VA, Low rank, r = 256) | 52.8 |
| Predictive + Transitional (VA, Low rank) | 54.8 |

Note that VA stands for Visual Attributes.

Table 4 reports results obtained from the EPIC-KITCHENS unseen kitchens action anticipation challenge submission server 3. Data representative of the described model is reported by the row "Ours (Predictive [D]+Transitional)". On both datasets, the described method outperforms all previously reported results under almost all metrics. In particular embodiments, a top-performing model may be simple and may not make use of any ensembling nor optical flow input. In Table 4; A@1 is top-1 accuracy, A@5 is top-5 accuracy, P is precision, and R is recall.

TABLE 4

|  | Action | | | | Verb | | | | Noun | | | |
|---|---|---|---|---|---|---|---|---|---|---|---|---|
|  | A@1 | A@5 | P | R | A@1 | A@5 | P | R | A@1 | A@5 | P | R |
| TSN Fusion | 1.7 | 9.1 | 1.0 | 0.9 | 25.4 | 68.3 | 13.0 | 5.7 | 9.8 | 27.2 | 5.1 | 5.6 |
| TSN Flow | 1.8 | 8.2 | 1.1 | 0.9 | 25.6 | 67.6 | 10.8 | 6.3 | 8.4 | 24.6 | 5.0 | 4.7 |
| TSN RGB | 2.4 | 9.6 | 0.3 | 1.2 | 25.3 | 68.3 | 7.6 | 6.1 | 10.4 | 29.5 | 8.8 | 6.7 |
| DMI-UNICT | 5.5 | 14.6 | 1.4 | 2.3 | 18.6 | 61.6 | 10.8 | 7.1 | 9.8 | 24.3 | 6.6 | 6.1 |

TABLE 4-continued

| | Action | | | | Verb | | | | Noun | | | |
|---|---|---|---|---|---|---|---|---|---|---|---|---|
| | A@1 | A@5 | P | R | A@1 | A@5 | P | R | A@1 | A@5 | P | R |
| Ours (Predictive) | 6.1 | 18.0 | 1.6 | 2.9 | 27.5 | 71.1 | 12.3 | 8.4 | 10.8 | 30.6 | 8.6 | 8.7 |
| Ours (Predictive + Transitional) | 7.2 | 19.3 | 2.2 | 3.4 | 28.4 | 70.0 | 11.6 | 7.8 | 12.4 | 32.2 | 8.4 | 9.9 |

Table 5 shows comparison to state-of-the-art on the Breakfast dataset. Table 5 shows anticipation accuracy averaged over all the test splits and use T=1 sec.

TABLE 5

| Model | Accuracy |
|---|---|
| Random Baseline | 2.1 |
| Vondrick | 8.1 |
| Abu Farha (CNN) | 27.0 |
| Abu Farha (RNN) | 30.1 |
| Ours (Transitional (AR)) | 23.9 |
| Ours (Predictive) | 31.9 |
| Ours (Predictive + Transitional (AR)) | 32.3 |

In particular embodiments, through the analysis of the transitional model $f_{trans}$, the visual attributes responsible for the anticipation of each action class can be analyzed. For example, the linear weights from $g_t$ can be analyzed to list the top visual attributes maximizing the prediction of each action class. Table 6 shows some action classes from the ActivityNet 200 dataset and the top-3 visual attributes that maximize their anticipation. For example, using this analysis, one can observe that identifying a "Border collie dog" (a dog specialized in the activity of disc dog) in a video may be useful for the prediction of the "Disc dog" action class. Recognizing "Lemon" and "Measure cup" may be indicative for the anticipation of "Making lemonade." Similarly identifying the visual attribute "Checking tires" may be important for the anticipation of the action class "Change car wheel."

TABLE 6

| Action to anticipate | Top-3 visual attributes |
|---|---|
| Applying sunscreen | Sunscreen, Lotion, Swimming trunk |
| Bull fighting | Ox, Bulldozing, Bullring |
| Baking cookies | Bakery shop, Pantry, Espresso maker |
| Camel ride | Arabian camel, Crane, Riding scooter |
| Changing car wheel | Half-track, Checking tires, Car wheel |
| Cleaning sink | Monarch, Washbasin, Soap dispenser |
| Curling | Wall clock, Ice skating, Anemone fish |
| Disc dog | Border collie, Collie, Borzoi |
| Doing karate | Breaking board, Side kick, Peacock |
| Doing motorcross | Moped, Reflex Camera, Lens cap |
| Drinking coffee | Hamper, Coffee mug, Espresso |
| Fixing roof | Construction site, solar dish, hammer |
| Grooming dog | Miniature poodle, briard, cairn |
| Long jump | Football field, Triple jump, Longboard |
| Making an omelette | Cooking egg, Wok, Shaking head |
| Making lemonade | Lemon, Measure cup, Pitch |
| Painting furniture | Printer, Chiffonier, Playing lute |
| Playing ice hockey | Hockey arena, Hokey stop, Teapot |
| Playing pool | Pool table, Squirrel monkey, Recreation room |
| Preparing pasta | Guacamole, Carbonara, Frying pan |
| Preparing salad | Wok, Head cabbage, Winking |
| Rafting | Raft, Clumber, Pouring beer |
| Raking leaves | Hay, Sweeping floor, Rapeseed |
| River tubing | Swimming hole, Drake, Raft |
| Roof shingle removal | Cottage, House, Whiptail |
| Using parallel bars | Parallel bars, High jump, Coral fungus |
| Using the balance beam | Gymnastic tumbling, Balance beam, Cock |
| Wake boarding | Breakwater, Zucchini, Water sliding |

Figure 4A:
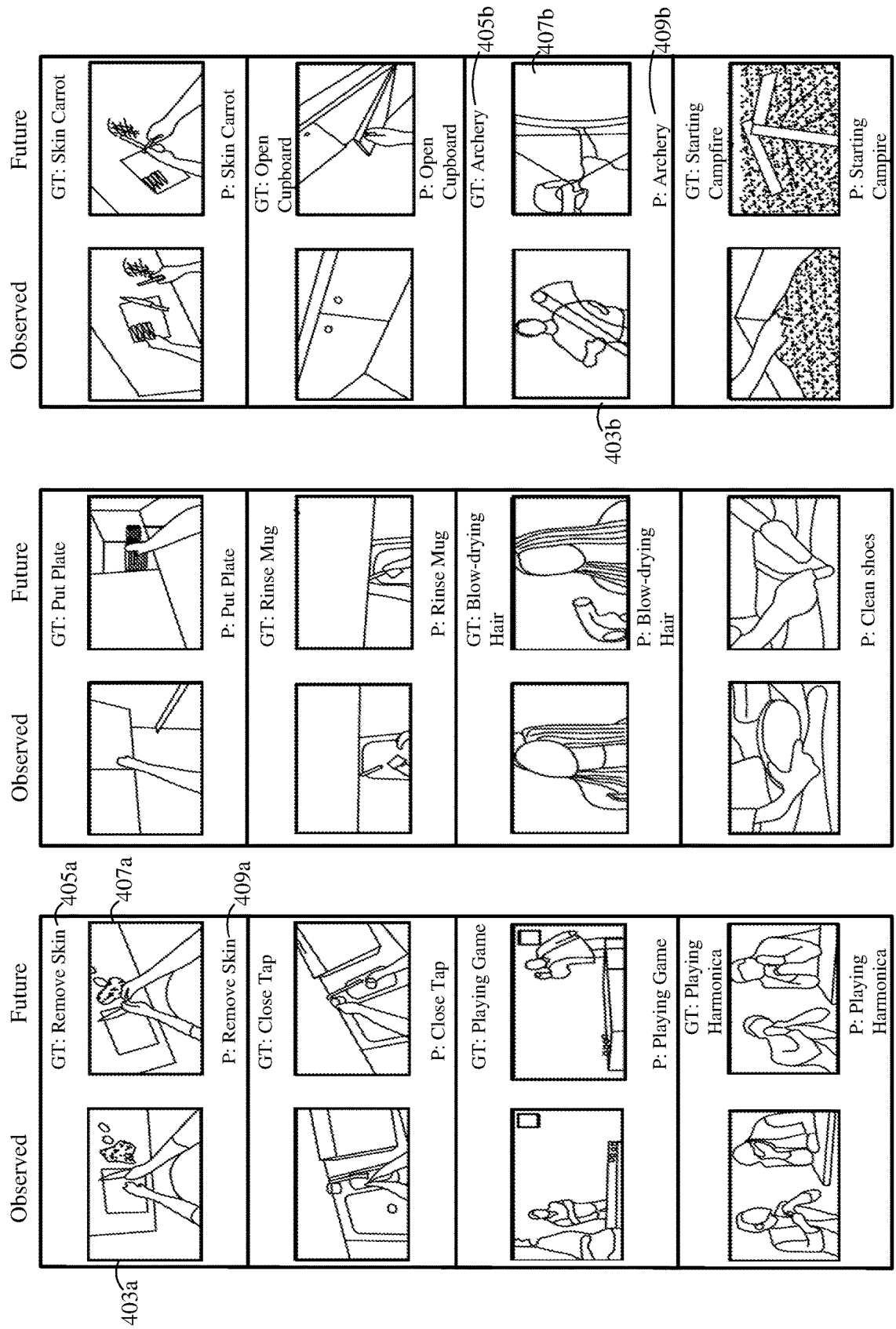
FIGS. 4A-4B illustrates example action anticipation predictions and mispredictions.

FIG. 4A shows examples of action anticipation predictions on the EPICKITCHENS and ActivityNet dataset. In particular, FIG. 4A shows correctly predicted actions based on the observed video portions. For example, from the observed video 403a showing a person holding a knife near a cutting board and vegetables, the system was able to predict a future action for the future video 407a. The predicted action 409a "Remove Skin" matches the ground truth 405a. Similarly, from the observed video 403b showing a person holding compound bow, the system correctly predicted a future action for the future video 407b. The predicted action 409b "Archery" correctly matches the ground truth 405b.

Figure 4B:
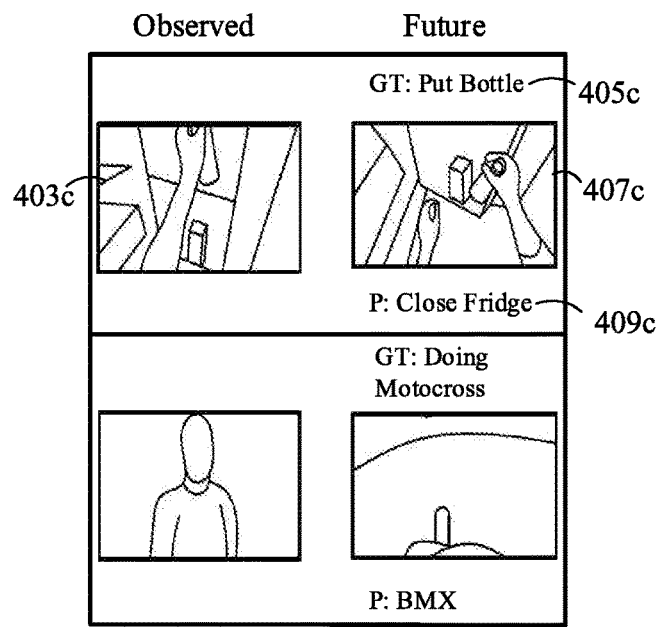
Figure 4B:
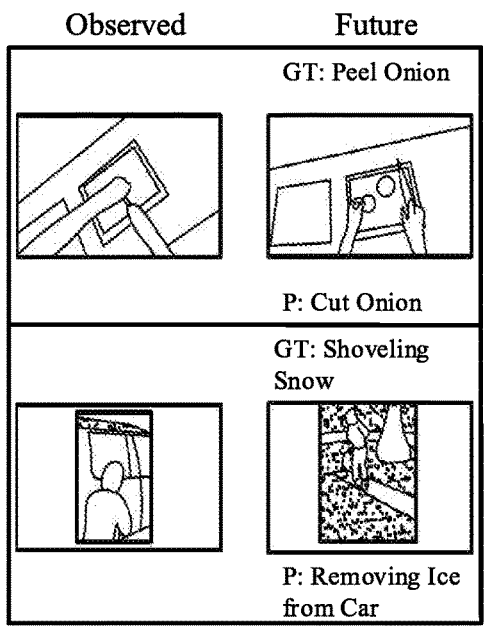
Figure 4B:
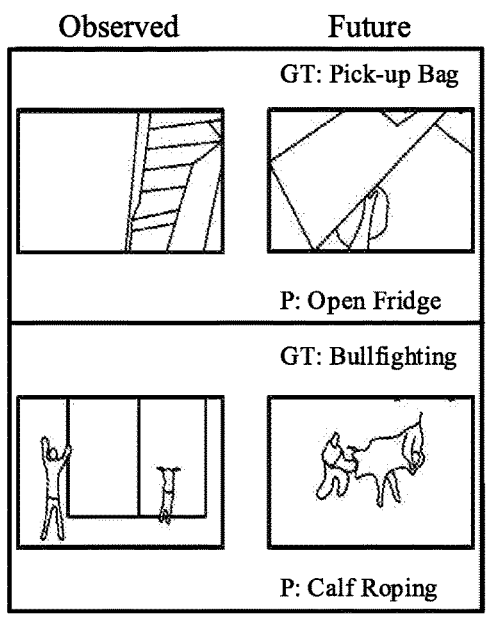

FIG. 4B shows examples of action anticipation mispredictions. FIG. 4B shows incorrectly predicted actions based on the observed video portions. For example, the observed video 403c showing a person holding a bottle in a refrigerator. The system may have predicted a future action for the future video 407c. The predicted action 409c may have been "Close Fridge" based on the positioning of the person and the bottle. However, the true future action 405c may have been "Put Bottle" meaning, to put the bottle into the refrigerator before closing the door. This example shows the nuances the system must analyze to correctly predict actions. The remaining mispredictions, including mis-predicting "Doing motocross" for "BMX, "peeling onion" for "cutting onion" "showing snow" for "removing ice from car" "pick-up bag" for "open fridge," and "bullfighting" for "calf roping" illustrate also that when the described system is incorrect, the results are still valuable. For example, the system may inform moderators of the nature of the mistake, allowing for appropriate corrective action to be taken.

Figure 5:
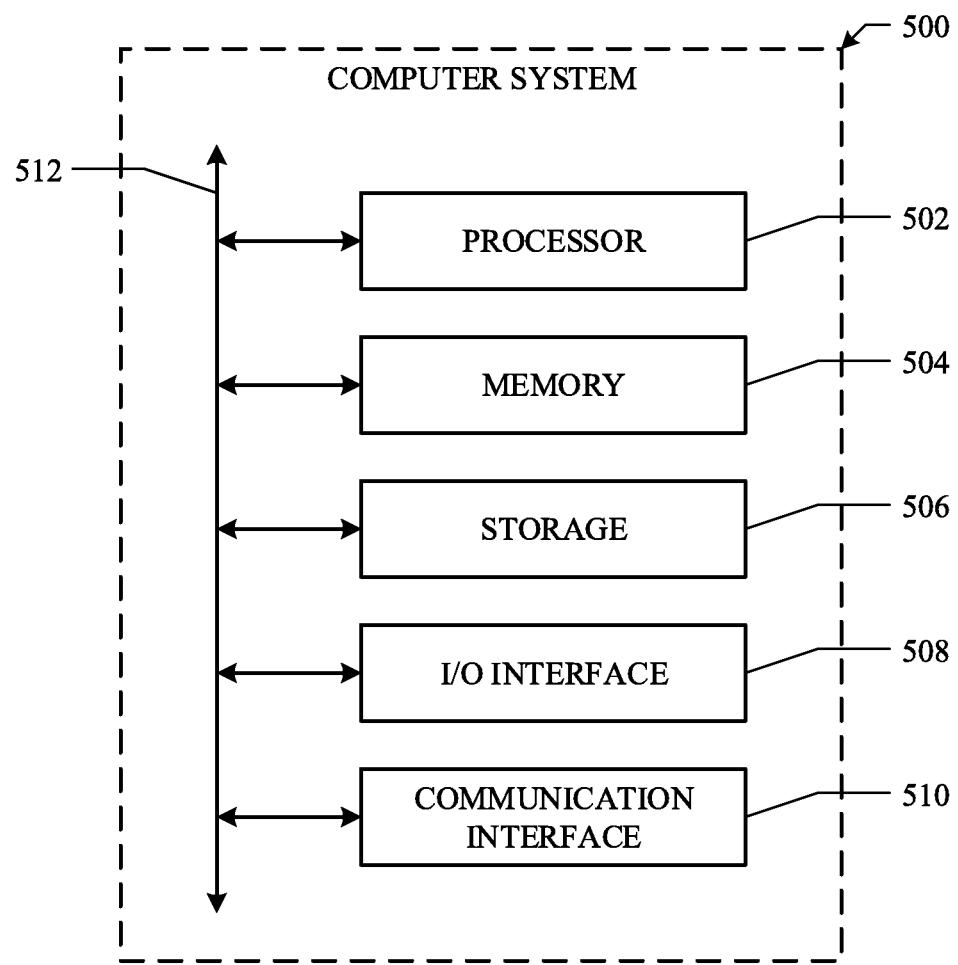
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 6:
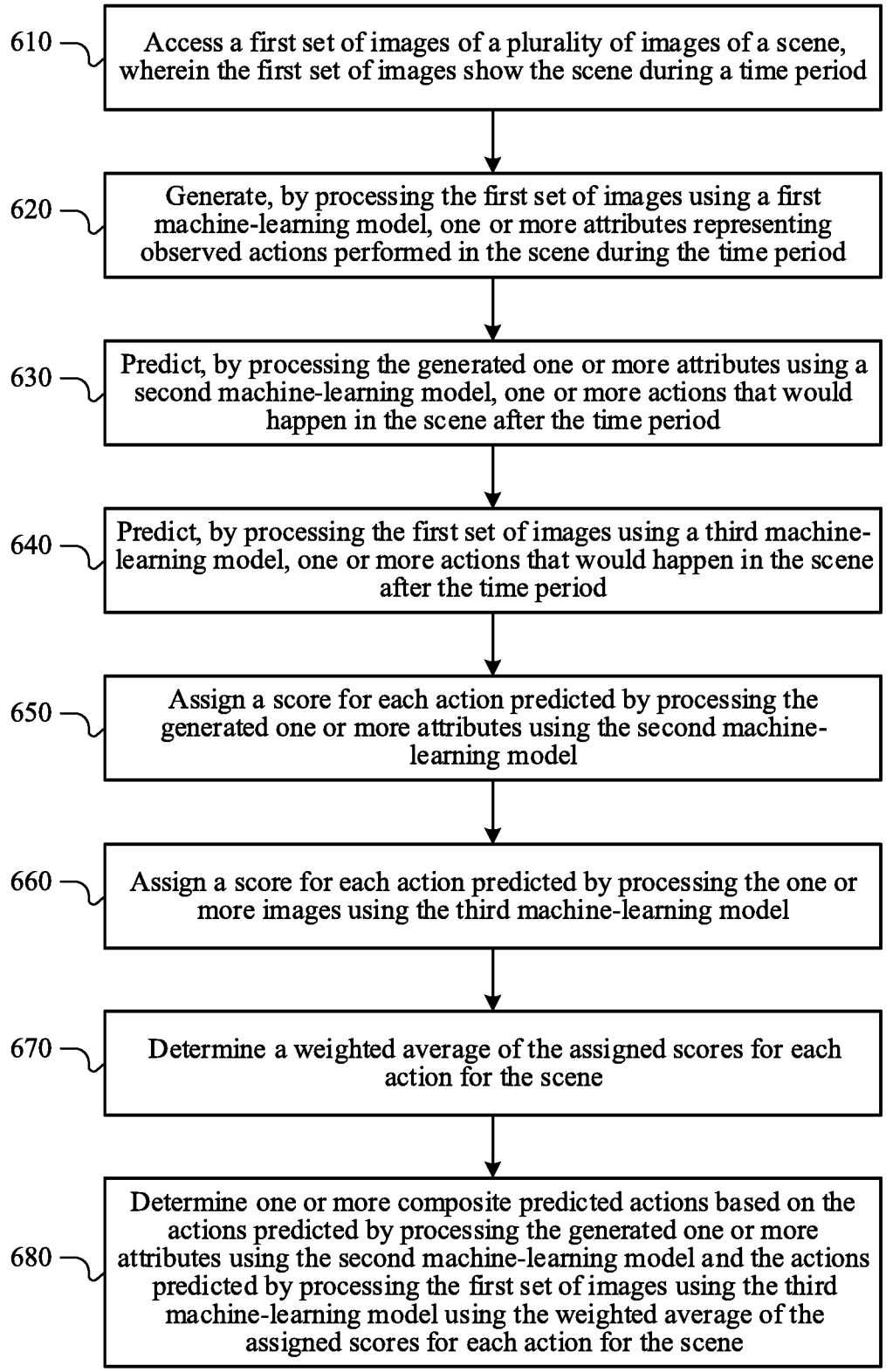
FIG. 6 illustrates an example method for anticipating future actions based on present video.

FIG. 6 illustrates an example method for anticipating future actions based on present video. The method may begin at step 610, where a video processing system may access a first set of images of a plurality of images of a scene, wherein the first set of images show the scene during a time period. For example, the images may be frames from a video showing the scene during the time period. At step 620, the video processing system may generate, by processing the first set of images using a first machine-learning model, one or more attributes representing observed actions performed in the scene during the time period. For example, the first machine-learning model may be a convolutional neural network, as in the first prediction stage $g_s$ 310 of the transitional model $f_{trans}$ 233. The attributes may be represented, for example in a action state s 320. At step 630, the video processing system may predict, by processing the generated one or more attributes using a second machine-learning model, one or more actions that would happen in the scene after the time period. For example, the second machine-learning model may be a Markov transition matrix as in the second prediction stage $g_t$ 330 of the transitional model $f_{trans}$ 233. The second machine-learning model may be a liner transition model as in the second prediction stage $g_t$ 380 of the transitional model $f_{trans}$ 233. In particular embodiments, the method may optionally stop after step 630 and the video processing system may use the predicted actions from step 630.

In particular embodiments, the method 600 may continue. At step 640, the video processing system may predict, by processing the first set of images using a third machine-learning model, one or more actions that would happen in the scene after the time period. For example, the video processing system may use a predictive model $f_{pred}$ 235 to process the first set of images to directly predict actions that would happen in the scene after the time period. In particular embodiments, the third machine-learning model may be a convolutional neural network. At step 650, the video processing system may assign a score for each action predicted by processing the generated one or more attributes using the second machine-learning model. At step 660, the video processing system may assign a score for each action predicted by processing the one or more images using the third machine-learning model. At step 670, the video processing system may determine a weighted average of the assigned scores for each action for the scene. In particular embodiments, a single weighting value may be used for the all of the scores (e.g., in an equal weighting scenario). In particular embodiments, a weighting value may be shared across scores assigned to actions predicted based on the same source (e.g., all scores assigned to actions predicted by processing the generated one or more attributes using the second machine-learning model may be treated with the same weighting value and all scores assigned to actions predicted by processing the one or more images using the third machine-learning model may be treated with the same weighting value). In particular embodiments, different weighting values may be used for each score. At step 680, the video processing system may determine one or more composite predicted actions based on the actions predicted by processing the generated one or more attributes using the second machine-learning model and the actions predicted by processing the first set of images using the third machine-learning model using the weighted average of the assigned scores for each action for the scene.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for anticipating future actions based on present video including the particular steps of the method of FIG. 6, this disclosure contemplates any suitable method for anticipating future actions based on present video including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   accessing a first set of images of a plurality of images of a scene, wherein the first set of images show the scene during a time period;
   generating, by processing the first set of images using a first machine-learning model, one or more attributes representing one or more of observed actions performed in the scene during the time period or visual attributes appearing in the scene during the time period, wherein the one or more attributes further includes probabilities indicating one or more of likelihoods that the observed actions are accurately represented or likelihoods that the visual attributes are accurately represented, wherein the first machine-learning model receives the first set of images as input and wherein the one or more attributes represent at least one of observed characteristics of the scene during the time period, a description of the scene during the time period, a description of an action performed in the scene, or a description of entities in the scene, and
   predicting, with a second machine-learning model, one or more actions that would happen in the scene after the time period based on the one or more of the observed actions or the visual attributes, and the probabilities generated by the first machine-learning model,
   wherein the first machine-learning model and the second machine-learning model are different types of learning models.

2. The method of claim 1, further comprising:
   predicting, by processing the first set of images using a third machine-learning model, one or more actions that would happen in the scene after the time period; and
   determining one or more composite predicted actions based on the actions predicted by processing the generated one or more attributes using the second machine-learning model and the actions predicted by processing the first set of images using the third machine-learning model.

3. The method of claim 2, wherein determining the one or more composite predicted actions based on the actions predicted by processing the generated one or more attributes using the second machine-learning model and the actions predicted by processing the first set of images using the third machine-learning model further comprises:
   assigning a score for each action predicted by processing the generated one or more attributes using the second machine-learning model;
   assigning a score for each action predicted by processing the first set of images using the third machine-learning model; and
   determining a weighted average of the assigned scores for each action for the scene.

4. The method of claim 2, wherein the third machine-learning model was trained using loss minimization on a set of training images and corresponding potential predicted actions.

5. The method of claim 1, wherein the predicting, with the second machine-learning model, one or more actions that would happen in the scene after the time period comprises:
   accessing a set of potential actions for the scene, wherein each action of the set of potential actions is associated with a set of attributes considered predictive of the action occurring; and selecting one or more actions from the set of potential actions for the scene after the time period based on the determined probabilities and the actions considered predictive of the action occurring.

6. The method of claim 5, wherein the set of potential actions for the scene have been pre-generated by a machine-learning model.

7. The method of claim 1, further comprising:
accessing a second set of images of the plurality of the images of the scene, wherein the second set of images show the scene before the time period;
generating, by processing the second set of images using the first machine-learning model, one or more attributes representing observed actions performed in the scene before the time period; and
wherein the predicting one or more actions that would happen in the scene after the time period is performed by processing the generated one or more attributes representing observed actions performed in the scene before the time period and the generated one or more attributes representing observed actions performed in the scene during the time period.

8. The method of claim 1, wherein the one or more actions that would happen in the scene after the time period is further predicted by the second machine-learning model based on content of the first set of images.

9. The method of claim 1, wherein processing the generated one or more attributes using the second machine-learning model comprises correlating the generated one or more attributes with potential predicted actions for the scene after the time period.

10. The method of claim 1, wherein the plurality of images are frames of a video recording of the scene during the time period.

11. The method of claim 1, further comprising:
predicting a label for the scene after the time period based on the generated one or more attributes representing one or more actions performed in the scene during the time period.

12. One or more computer-readable non-transitory storage media embodying software that is operable when executed to:
access a first set of images of a plurality of images of a scene, wherein the first set of images show the scene during a time period;
generate, by processing the first set of images using a first machine-learning model, one or more attributes representing one or more of observed actions performed in the scene during the time period or visual attributes appearing in the scene during the time period, wherein the one or more attributes further includes probabilities indicating one or more of likelihoods that the observed actions are accurately represented or likelihoods that the visual attributes are accurately represented, wherein the first machine-learning model receives the first set of images as input and wherein the one or more attributes represent at least one of observed characteristics of the scene during the time period, a description of the scene during the time period, a description of an action performed in the scene, or a description of entities in the scene; and
predict, with a second machine-learning model, one or more actions that would happen in the scene after the time period based on the one or more of the observed actions or the visual attributes, and the probabilities generated by the first machine-learning model, wherein the first machine-learning model and the second machine-learning model are different types of learning models.

13. The computer-readable non-transitory storage media of claim 12, wherein the software is further operable when executed to:
predict, by processing the first set of images using a third machine-learning model, one or more actions that would happen in the scene after the time period; and
determine one or more composite predicted actions based on the actions predicted by processing the generated one or more attributes using the second machine-learning model and the actions predicted by processing the first set of images using the third machine-learning model.

14. The computer-readable non-transitory storage media of claim 13, wherein the software operable to determine the one or more composite predicted actions based on the actions predicted by processing the generated one or more attributes using the second machine-learning model and the actions predicted by processing the first set of images using the third machine-learning model is further operable to when executed to:
assign a score for each action predicted by processing the generated one or more attributes using the second machine-learning model;
assign a score for each action predicted by processing the first set of images using the third machine-learning model; and
determine a weighted average of the assigned scores for each action for the scene.

15. The computer-readable non-transitory storage media of claim 13, wherein the third machine-learning model was trained using loss minimization on a set of training images and corresponding potential predicted actions.

16. A system comprising:
one or more processors; and
one or more computer-readable non-transitory storage media coupled to one or more of the processors and comprising instructions operable when executed by one or more of the processors to cause the system to:
access a first set of images of a plurality of images of a scene, wherein the first set of images show the scene during a time period;
generate, by processing the first set of images using a first machine-learning model, one or more attributes representing one or more of observed actions performed in the scene during the time period or visual attributes appearing in the scene during the time period, wherein the one or more attributes further includes probabilities indicating one or more of likelihoods that the observed actions are accurately represented or likelihoods that the visual attributes are accurately represented, wherein the first machine-learning model receives the first set of images as input and wherein the one or more attributes represent at least one of observed characteristics of the scene during the time period, a description of the scene during the time period, a description of an action performed in the scene, or a description of entities in the scene; and
predict, with a second machine-learning model, one or more actions that would happen in the scene after the time period based on the one or more of the observed actions or the visual attributes, and the probabilities generated by the first machine-learning model, wherein the first machine-learning model and the second machine-learning model are different types of learning models.

17. The system of claim 16, wherein the processors are further operable when executing the instructions to:
   predict, by processing the first set of images using a third machine-learning model, one or more actions that would happen in the scene after the time period; and
   determine one or more composite predicted actions based on the actions predicted by processing the generated one or more attributes using the second machine-learning model and the actions predicted by processing the first set of images using the third machine-learning model.

18. The system of claim 17, wherein the instructions operable when executed by one or more of the processors to cause the system to determine the one or more composite predicted actions based on the actions predicted by processing the generated one or more attributes using the second machine-learning model and the actions predicted by processing the first set of images using the third machine-learning model are further operable to cause the system to:
   assign a score for each action predicted by processing the generated one or more attributes using the second machine-learning model;
   assign a score for each action predicted by processing the first set of images using the third machine-learning model; and
   determine a weighted average of the assigned scores for each action for the scene.

19. The system of claim 17, wherein the third machine-learning model was trained using loss minimization on a set of training images and corresponding potential predicted actions.

\* \* \* \* \*